(12) United States Patent
More et al.

(10) Patent No.: US 12,716,504 B1

(45) Date of Patent: Aug. 25, 2026

(54) LABYRINTH SEAL FOR REAR OF INTERNAL COMBUSTION ENGINE

(71) Applicant: DEERE & COMPANY, Moline, IL (US)

(72) Inventors: Swapnil S. More, Pune (IN); Vaibhav V. Karekar, Pune (IN); Ayoub J. Siddiqui, Cedar Falls, IA (US); Richard T. Hurban, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 19/292,297

(22) Filed: Aug. 6, 2025

(51) Int. Cl.
*F16J 15/447* (2006.01)
*F16J 15/3232* (2016.01)

(52) U.S. Cl.
CPC ....... *F16J 15/4476* (2013.01); *F16J 15/3232* (2013.01)

(58) Field of Classification Search
CPC .... F16J 15/447; F16J 15/4476; F16J 15/4478; F16J 15/3232
See application file for complete search history.

(56) References Cited

U.S. PATENT DOCUMENTS

| | | | |
|---|---|---|---|
| 4,427,202 A | 1/1984 | Backlin | |
| 4,531,746 A | 7/1985 | Amdall et al. | |
| 4,667,967 A | 5/1987 | Deuring | |
| 5,653,448 A | 8/1997 | Schlosser | |
| 7,175,388 B2 | 2/2007 | Labbe et al. | |
| 8,858,162 B2 | 10/2014 | Manzoori | |
| 10,724,640 B2 | 7/2020 | Jaskot et al. | |
| 2019/0063546 A1* | 2/2019 | Nakashima | F16F 15/126 |

FOREIGN PATENT DOCUMENTS

| | | | |
|---|---|---|---|
| DE | 4216568 A1 * | 12/1993 | F16J 15/3252 |
| JP | 2007030126 A * | 2/2007 | |
| JP | 2007291891 A * | 11/2007 | F02N 15/02 |

OTHER PUBLICATIONS

Machine Translation JP2007030126 (Year: 2006).*
Machine Translation DE4216568 (Year: 2026).*
Machine Translation JP2007291891 (Year: 2026).*

* cited by examiner

*Primary Examiner* — Gilbert Y Lee

(57) ABSTRACT

An internal combustion engine includes an engine block rotatably supporting a crankshaft for rotation about a crank axis. The engine block includes a rear end wall that defines a rear crankcase opening. A rear main seal is positioned within the rear crankcase opening. The rear main seal is configured for sealing the rear crankcase opening between the engine block and the crankshaft. A torque transmitting disc is mounted to a rearward end of the crankshaft for rotation with the crankshaft about the crank axis. The rear end wall of the engine block and a forward facing end surface of the torque transmitting disc are formed to define a labyrinth seal therebetween. The labyrinth seal is disposed radially outward of the rear main seal relative to the crank axis for blocking debris from contacting the rear main seal from an external side of the rear main seal.

14 Claims, 3 Drawing Sheets

LABYRINTH SEAL FOR REAR OF INTERNAL COMBUSTION ENGINE

TECHNICAL FIELD

The disclosure generally relates to an internal combustion engine.

BACKGROUND

An internal combustion engine includes an engine block rotatably supporting a crankshaft for rotation about a crank axis. The engine block includes a rear end wall defining a rear crankcase opening, with the crankshaft extending through the rear crankcase opening for attachment to a transmission. A rear main seal is positioned within the rear crankcase opening, and is disposed annularly about a circumference of the crankshaft for sealing the rear crankcase opening between the engine block and the crankshaft. The rear main seal keeps lubricating oil within an interior crankcase of the engine block, and prevents exterior contaminants from entering the interior crankcase.

Some vehicle types, e.g., bulldozers and/or crawlers, may include cooling air fans that are positioned near the rear main seal of the engine. The cooling air fans may indirectly move air past the rear main seal. When operating in extremely dusty conditions, the rear main seals of these vehicle types may be exposed to excessive air pressure via fan blast from the cooling air fans, which may carry an excessive amount of airborne contaminates. Exposure to excessive contaminates may reduce the useful life of the rear main seal.

SUMMARY

An internal combustion engine is provided. The internal combustion engine includes an engine block rotatably supporting a crankshaft for rotation about a crank axis. The engine block includes a rear end wall that defines a rear crankcase opening. The crankshaft extends through the rear crankcase opening. A rear main seal is positioned within the rear crankcase opening. The rear main seal is disposed annularly about a circumference of the crankshaft for sealing the rear crankcase opening between the engine block and the crankshaft. A torque transmitting disc is mounted to a rearward end of the crankshaft for rotation with the crankshaft about the crank axis. The rear end wall of the engine block and a forward facing end surface of the torque transmitting disc are formed to define a labyrinth seal therebetween. The labyrinth seal is disposed radially outward of the rear main seal relative to the crank axis for blocking debris from contacting the rear main seal from an external side of the rear main seal.

In one aspect of the disclosure, the torque transmitting disc may include one of, but is not limited to, a flywheel or a flexplate. As is understood by those skilled in the art, a flywheel is attached to the crankshaft, and is coupled to a clutch of a manual transmission for communicating torque between the internal combustion engine and the transmission, whereas a flexplate is attached to the crankshaft, and is coupled to a torque converter of an automatic transmission for communicating torque between the internal combustion engine and the transmission.

In one aspect of the disclosure, the rear end wall of the engine block may include a rear cover plate defining the rear crankcase opening. The rear cover plate may be attached to the engine block and at least partially define the rear end wall of the engine block. In other implementations, the rear end wall of the engine block may be integrally cast with the engine block.

In one aspect of the disclosure, the labyrinth seal may include an annular block projection defined by the rear end wall. The annular block projection is disposed radially about the crank axis and extends from the rear end wall a first distance in a rearward direction along the crank axis. The labyrinth seal may further include an annular disc projection defined by the torque transmitting disc. The annular disc projection is disposed radially about the crank axis and extends from the forward facing end surface a second distance in a forward direction along the crank axis.

In one aspect of the disclosure, the annular block projection and the annular disc projection may overlap each other axially along the crank axis.

In one aspect of the disclosure, the annular disc projection may be disposed radially outward of the annular block projection relative to the crank axis. However, in other implementations, the annular disc projection may be disposed radially inward of the annular block projection relative to the crank axis.

In one aspect of the disclosure, a rearward end surface of the annular block projection may be spaced from the forward facing end surface of the torque transmitting disc a first seal distance axially along the crank axis. The first seal distance may be between the range of 2.0 mm and 8.0 mm.

In one aspect of the disclosure, the annular block projection is radially spaced from the annular disc projection a second seal distance relative to the crank axis. The second seal distance is preferably at least equal to or greater than 1.5 mm.

In one aspect of the disclosure a forward end surface of the annular disc projection is spaced from the rear end wall a third seal distance axially along the crank axis. The third seal distance is preferably at least equal to or greater than 2.0 mm. In one implementation, the third seal distance may be between the range of 2.0 mm and 8.0 mm.

In one aspect of the disclosure, the forward facing end surface of the torque transmitting disc defines a substantially flat surface extending radially outward away from the labyrinth seal to a radially outer edge of the torque transmitting disc.

In one aspect of the disclosure, a rearward mounting surface of the crankshaft is disposed axially forward of a rearward end surface of the annular block projection along the crank axis. The torque transmitting disc includes a forward mounting surface disposed against the rearward mounting surface of the crankshaft. The forward mounting surface of the torque transmitting disc is disposed axially forward of the rearward end surface of the annular block projection along the crank axis. The forward mounting surface of the torque transmitting disc may be disposed axially rearward of a forward end surface of the annular disc projection along the crank axis.

Accordingly, the labyrinth seal captures and/or traps exterior contaminates from reaching and/or contacting the rear main seal, thereby protecting the rear main seal from excessive contact with contaminants, such as dirt and dust. The dirt and debris trapped by the labyrinth seal may be flung out and away from the rear main seal during rotation of the crankshaft and the torque transmitting disc about the crank axis, thereby cleaning the debris from the labyrinth seal. The substantially flat surface disposed radially outward of the labyrinth seal enables the debris trapped in the labyrinth seal to be flung outward away from the rear main seal as the torque transmitting disc rotates about the crank axis, thereby removing contaminates from the region near the rear main seal.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
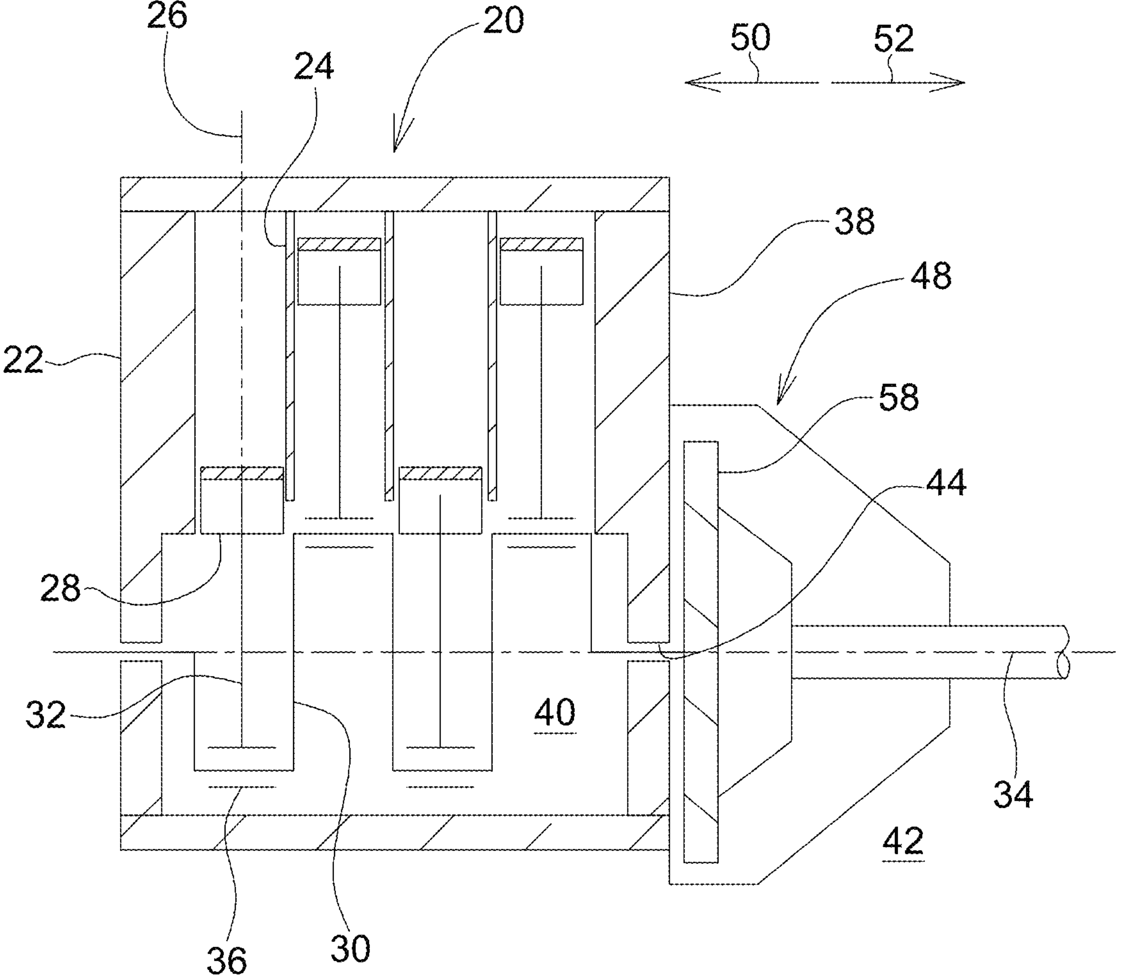
FIG. 1 is a schematic cross-sectional side view of an internal combustion engine coupled to a transmission.

Referring to the Figures, wherein like numerals indicate like parts throughout the several views, an internal combustion engine is generally shown at 20. Referring to FIG. 1, the internal combustion engine 20 includes an engine block 22. The engine block 22 defines at least one cylinder bore 24 having a central bore axis 26. It should be appreciated that the engine block 22 may define multiple cylinder bore 24*s*, as is understood in the art. A piston 28 is moveable within the cylinder bore 24 along the central bore axis 26. As is understood in the art, the piston 28 may be attached to a crankshaft 30 via a connecting rod 32 and associated bearings (not shown). The engine block 22 rotatably supports the crankshaft 30 for rotation about a crank axis 34. The crankshaft 30 may be coupled to the engine block 22 via one or more bearing caps 36, with a main bearing disposed between the crankshaft 30 and the main bearing journals defined by the engine block 22 and the bearing caps 36.

The piston 28 moves along the central bore axis 26 in a reciprocating motion between a bottom dead center position and a top dead center position. As is understood in the art, the piston 28 may move through an engine cycle having four strokes, i.e., a four stroke engine. The four strokes of the engine cycle may be referred to as an intake stroke, a compression stroke, a combustion stroke, and an exhaust stroke. During the combustion stroke, combustion of a fuel within the cylinder bore 24 generates a force that moves the piston 28 downward within the cylinder bore 24. The force applied against the piston 28 by the combustion within the cylinder bore 24 and the movement of the piston 28 associated therewith generates torque in the crankshaft 30 and causes rotation of the crankshaft 30 about the crank axis 34.

The engine block 22 includes a rear end wall 38. The rear end wall 38 separates an internal space of the engine block 22, commonly referred to as a crankcase 40, from an exterior or external side 42 of the engine block 22. As used herein, the term "internal" or "interior side" refers to the internal space, i.e., the crankcase 40 defined by the engine block 22, whereas the term "external" or "exterior", or "exterior side" refers to a side of the rear end wall 38 of the engine block 22 that is external to or outside of the crankcase 40. The rear end wall 38 of the engine block 22 defines a rear crankcase opening 44. The rear crankcase opening 44 is generally circular in shape, and arranged perpendicular to the crank axis 34. The crankshaft 30 partially extends through the rear crankcase opening 44. More specifically, a rearward end 46 of the crankshaft 30 extends through the rear crankcase opening 44. The rearward end 46 of the crankshaft 30 is configured to be coupled via a torque transmitting device to a transmission 48 of the vehicle.

As used herein, the term "rearward" may be defined as the end of the engine block 22 along the crank axis 34 that is disposed nearest the transmission 48 of the vehicle, typically nearer a rearward end 46 of the vehicle, whereas the term "forward" may be defined as the end of the engine block 22 along the crank axis 34 that is disposed farthest from the transmission 48 of the vehicle, typically nearer a forward end of the vehicle. The term "forward direction 50" may be defined herein as a direction when moving from a center of the crankcase 40 toward the forward end of the engine block 22 along the crank axis 34, whereas the term "rearward direction 52" may be defined herein as a direction when moving from the center of the crankcase 40 toward the rearward end 46 of the engine block 22 along the crank axis 34.

Figure 2:
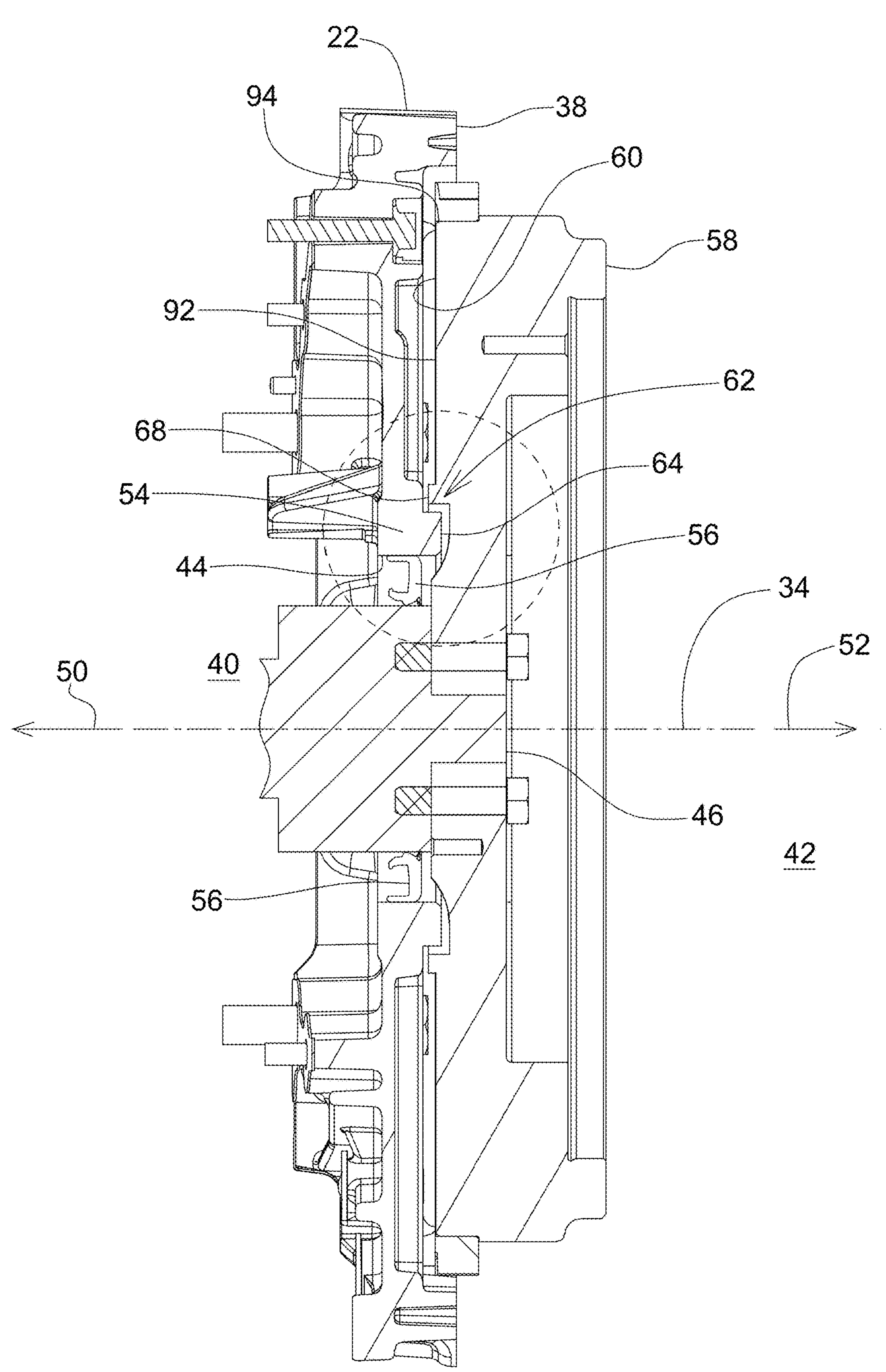
FIG. 2 is a fragmentary cross sectional side view of a rearward end of the internal combustion engine.

In one implementation, the rear end wall 38 of the engine block 22 may be integrally formed with the entirety of the engine block 22 as a single unit of manufacture. However, in other implementations, such as shown in FIG. 2, the rear end wall 38 of the engine block 22 may include a rear cover plate 54 that is bolted, fastened, or otherwise attached to the engine block 22 to define at least a portion of the rear end wall 38 of the engine block 22. The rear cover plate 54 may define the rear crankcase opening 44 through which the crankshaft 30 passes.

Figure 3:
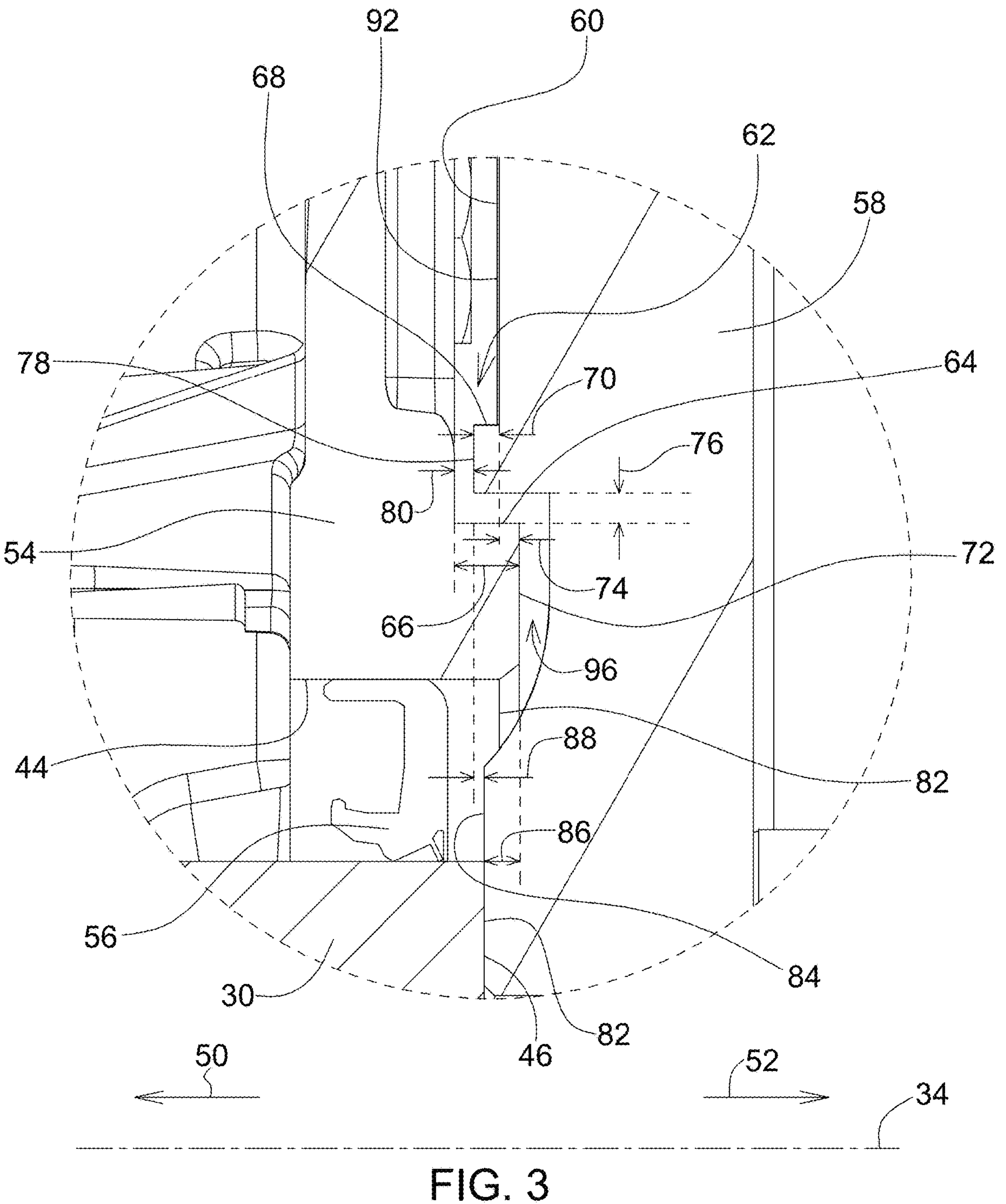
FIG. 3 is an enlarged fragmentary cross sectional side view of the rearward end of the internal combustion engine.

Referring to FIGS. 2 and 3, a rear main seal 56 is positioned within the rear crankcase opening 44. The rear main seal 56 is disposed annularly about a circumference of the crankshaft 30 for sealing the rear crankcase opening 44 between the engine block 22 and the crankshaft 30. Generally, the rear main seal 56 includes a metal sleave press fit into the rear crankcase opening 44 in the rear end wall 38 of the engine block 22, and includes a rubber or rubberlike lip seal extending around and abutting the annular circumference of the crankshaft 30. The specific features and construction of the rear main seal 56 are understood by those skilled in the art, are not pertinent to the teachings of this disclosure, and are therefore not described in greater detail herein.

A torque transmitting disc 58 is mounted to the rearward end 46 of the crankshaft 30. The torque transmitting disc 58 rotates with the crankshaft 30 about the crank axis 34. The torque transmitting disc 58 may include one of, but is not limited to, a flywheel or a flexplate. As is understood in the art, a flywheel is a heavy circular disc, to which a clutch for a manual transmission 48 is attached. A flexplate is a thin, lightweight circular disc that is attached to a torque converter of an automatic transmission 48. It should be appreciated that the torque transmitting disc 58 may be implemented in a configuration other than the exemplary implementation of the flywheel or the flexplate described herein.

The rear end wall 38 of the engine block 22 and a forward facing end surface 60 of the torque transmitting disc 58 are formed to define a labyrinth seal 62 therebetween. As such, the labyrinth seal 62 is positioned between the rear end wall 38 of the engine block 22 and the torque transmitting disc 58. The labyrinth seal 62 is disposed radially outward of the rear main seal 56 relative to the crank axis 34 for blocking debris from contacting the rear main seal 56 from an exterior or external side 42 of the rear main seal 56. Reducing the amount of debris contacting the external side 42 of the rear main seal 56 reduces wear on the rear main seal 56, thereby prolonging a useful operating life of the rear main seal 56. The labyrinth seal 62 is a mechanical sealing structure for preventing movement of debris between the rear end wall 38 of the engine block 22 and the torque transmitting disc 58. The labyrinth seal 62 includes a maze-like pathway 96 that creates a tortuous route that debris must pass through in order to contact the rear main seal 56.

As best shown in FIG. 3, the labyrinth seal 62 may include an annular block projection 64 that is defined by the rear end wall 38. The annular block projection 64 is a circular wall structure generally centered on the crank axis 34, and extending fully around the rear crankcase opening 44. The annular block projection 64 is disposed radially about the crank axis 34 and extends from the rear end wall 38 a first distance 66 in the rearward direction 52 along the crank axis 34. The annular block projection 64 is arranged radially outward of the rear main seal 56 relative to the crank axis 34.

The labyrinth seal 62 may further include an annular disc projection 68 that is defined by the torque transmitting disc 58. The annular disc projection 68 is a circular wall structure generally centered on the crank axis 34, and extending fully around the rear crankcase opening 44. The annular disc projection 68 is disposed radially about the crank axis 34, and extends from the forward facing end surface 60 of the torque transmitting disc 58 a second distance 70 in the forward direction 50 along the crank axis 34. The annular disc projection 68 is arranged radially outward of the rear main seal 56 relative to the crank axis 34.

The annular block projection 64 and the annular disc projection 68 partially overlap each other axially along the crank axis 34. In one implementation, the annular disc projection 68 is disposed radially outward of the annular block projection 64 relative to the crank axis 34. However, the relative position of each may be reversed, with the annular disc projection 68 disposed radially inward of the annular block projection 64 relative to the crank axis 34.

A rearward end surface 72 of the annular block projection 64 is spaced from the forward facing end surface 60 of the torque transmitting disc 58 a first seal distance 74 that is measured axially along the crank axis 34. The first seal distance 74 may be between the range of 0 mm and 8.0 mm. The annular block projection 64 is radially spaced from the annular disc projection 68 a second seal distance 76 relative to the crank axis 34, measured perpendicularly relative to the crank axis 34. The second seal distance 76 may be may be preferably equal to or greater than 1.5 mm. A forward end surface 78 of the annular disc projection 68 is spaced from the rear end wall 38 of the engine block 22 a third seal distance 80 that is measured axially along the crank axis 34. The third seal distance 80 may be between the range of 2.0 mm and 8.0 mm.

The crankshaft 30 presents a rearward mounting surface 82 configured for abutting the torque transmitting disc 58. The torque transmitting disc 58 presents a forward mounting surface 84 that is disposed against the rearward mounting surface 82 of the crankshaft 30. In one implementation, the rearward mounting surface 82 may be disposed axially forward of the rearward end surface 72 of the annular block projection 64 along the crank axis 34 a first offset distance 86. The first offset distance 86 may be between, as an example, 0 mm and 10.0 mm. As such, the forward mounting surface 84 of the torque transmitting disc 58 may be disposed axially forward of the rearward end surface 72 of the annular block projection 64 along the crank axis 34, thereby further defining the path of the labyrinth seal 62.

Additionally, in one implementation, the rearward mounting surface 82 of the crankshaft 30 and the forward mounting surface 84 of the torque transmitting disc 58 may be positioned along the crank axis 34 such that the forward mounting surface 84 of the torque transmitting disc 58 is disposed axially rearward of the forward end surface 78 of the annular disc projection 68 along the crank axis 34 a second offset distance 88. The second offset distance 88 may be between, as an example, 0 mm and 10.0 mm.

In one aspect of the disclosure, the forward facing end surface 60 of the torque transmitting disc 58 may define a substantially flat or planar surface 92 extending radially outward away from the labyrinth seal 62 to a radially outer edge 94 of the torque transmitting disc 58, relative to the crank axis 34. This flat or planar surface 92 on the torque transmitting disc 58 enables debris trapped by the labyrinth seal 62 to be flung radially outward away from the crank axis 34 during rotation of the crankshaft 30 and the torque transmitting disc 58, thereby removing the debris from the region between the engine block 22 and the torque transmitting disc 58. The planar surface 92 of the torque transmitting disc 58 may define a substantially annular or circular surface disposed perpendicular relative to the cranks axis, and may be machined smooth and flat so as to not obstruct movement of the debris being flung outward away from the labyrinth seal 62.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. An internal combustion engine comprising:

an engine block rotatably supporting a crankshaft for rotation about a crank axis;

wherein the engine block includes a rear end wall defining a rear crankcase opening, with the crankshaft extending through the rear crankcase opening;

a rear main seal positioned within the rear crankcase opening and disposed annularly about a circumference of the crankshaft for sealing the rear crankcase opening between the engine block and the crankshaft;

a torque transmitting disc mounted to a rearward end of the crankshaft for rotation with the crankshaft about the crank axis;

wherein the rear end wall of the engine block and a forward facing end surface of the torque transmitting disc are formed to define a labyrinth seal therebetween, with the labyrinth seal disposed radially outward of the rear main seal relative to the crank axis for blocking debris from contacting the rear main seal from an external side of the rear main seal;

wherein the labyrinth seal includes an annular block projection defined by the rear end wall, wherein the annular block projection is disposed radially about the crank axis and extends from the rear end wall a first distance in a rearward direction along the crank axis;

wherein the labyrinth seal includes an annular disc projection defined by the torque transmitting disc, wherein the annular disc projection is disposed radially about the crank axis and extends from the forward facing end surface a second distance in a forward direction along the crank axis; and wherein the annular block projection and the annular disc projection overlap each other axially along the crank axis.

2. The internal combustion engine set forth in claim 1, wherein the torque transmitting disc is one of a flywheel or a flexplate.

3. The internal combustion engine set forth in claim 1, wherein the rear end wall of the engine block includes a rear cover plate defining the rear crankcase opening.

4. The internal combustion engine set forth in claim 1, wherein the annular disc projection is disposed radially outward of the annular block projection relative to the crank axis.

5. The internal combustion engine set forth in claim 1, wherein a rearward end surface of the annular block projection is spaced from the forward facing end surface of the torque transmitting disc a first seal distance axially along the crank axis.

6. The internal combustion engine set forth in claim 5, wherein the first seal distance is between the range of 2.0 mm and 8.0 mm.

7. The internal combustion engine set forth in claim 6, wherein a forward end surface of the annular disc projection is spaced from the rear end wall a third seal distance axially along the crank axis.

8. The internal combustion engine set forth in claim 7, wherein the third seal distance is between the range of 2.0 mm and 8.0 mm.

9. The internal combustion engine set forth in claim 5, wherein the annular block projection is radially spaced from the annular disc projection a second seal distance relative to the crank axis.

10. The internal combustion engine set forth in claim 9, wherein the second seal distance is equal to or greater than 1.5 mm.

11. The internal combustion engine set forth in claim 1, wherein the forward facing end surface of the torque transmitting disc defines a substantially flat surface extending radially outward away from the labyrinth seal to a radially outer edge of the torque transmitting disc.

12. The internal combustion engine set forth in claim 1, wherein a rearward mounting surface of the crankshaft is disposed axially forward of a rearward end surface of the annular block projection along the crank axis.

13. The internal combustion engine set forth in claim 12, wherein the torque transmitting disc includes a forward mounting surface disposed against the rearward mounting surface of the crankshaft, with the forward mounting surface of the torque transmitting disc disposed axially forward of the rearward end surface of the annular block projection along the crank axis.

14. The internal combustion engine set forth in claim 13, wherein the forward mounting surface of the torque transmitting disc is disposed axially rearward of a forward end surface of the annular disc projection along the crank axis.

* * * * *